United States Patent Office 3,338,957
Patented Aug. 29, 1967

3,338,957
A-NORPREGNENE COMPOUNDS AND
INTERMEDIATES THEREFOR
Frank L. Weisenborn, Middlebush, N.J., assignor, by mesne assignments, to E. R. Squibb & Sons, Inc., New York, N.Y., a corporation of Delaware
No Drawing. Filed Mar. 30, 1959, Ser. No. 802,600
6 Claims. (Cl. 260—488)

This application is a continuation in part of Ser. No. 743,972, filed June 23, 1958, and now abandoned.

This invention relates to the synthesis of valuable steroids and has for its object the provision of steroids of the general Formula I:

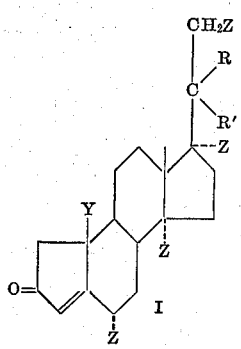

wherein R is hydrogen, R' is β-hydroxy or β-acyloxy, or together R and R' are keto, Y is hydrogen or methyl, and Z is hydrogen or methyl, not more than one Z being methyl. The preferred compounds are those wherein Y is methyl and Z is hydrogen. Examples of steroids of Formula I include A-norprogesterone, A-nor-19-norprogesterone, A-nor-6α-methylprogesterone, A-nor-14α-methylprogesterone, A-nor-17α-methylprogesterone, A-nor-21-methylprogesterone, the corresponding 20β-hydroxy derivatives, such as A-nor-Δ³-pregnene-20β-ol-2-one, and 20β-esters thereof, particularly the esters thereof with hydrocarbon carboxylic acids of less than ten carbon atoms.

To prepare the final products of this invention, Δ⁴-pregnene-3,20-dione, 19-nor-Δ⁴-pregnene-3,20-dione, 6α-methyl-Δ⁴-pregnene-3,20-dione, 14α-methyl-Δ⁴-pregnene-3,20-dione, 17α-methyl-Δ⁴-pregnene-3,20-dione or 21-methyl-Δ⁴-pregnene-3,20-dione of the general Formula II:

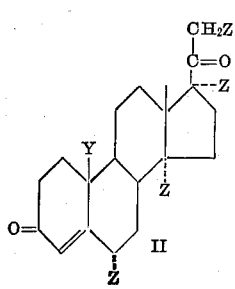

wherein the symbols Y and Z are as hereinbefore defined, are selectively reduced at the 20-carbonyl group using the method described by Norymberski and Woods in J. Chemical Soc., 3426–3430 (1955). In following this method a solution (0.4–0.6%) of the steroid in methanol is treated with sodium borohydride (1.4–1.6 mol) for 1 hour at 0° C. The mixture is then treated with a few drops of acetic acid, dried in vacuo and the residue extracted with benzene. The crude product in benzene is absorbed on a column of alumina (100 parts) and subjected to elution with benzene-ethylacetate (1:1). Fractions are collected and finally the column is eluted with ethylacetate. The eluate contains the 20β-ol derivatives corresponding to the 20-one starting materials of Formula II. These 20β-ol compounds are of the general Formula III:

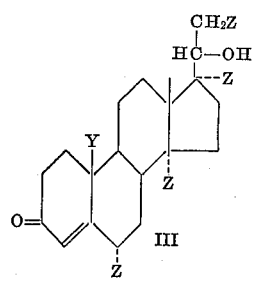

wherein the symbols Y and Z are as hereinbefore defined.

Alternatively, the 20β-ols of Formula III can be prepared by selectively reducing the progesterones of the general Formula II, using the following method. The progesterone starting material is dissolved in methanol and treated wth pyrrolidine as described by Johnson et al., JACS, vol. 78, p. 430 (1956), to form the 3-(N-pyrrolidinyl)-3,5-pregnadiene-20-one derivatives of the general Formula IV:

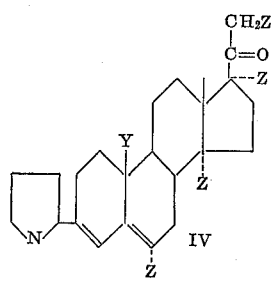

wherein the symbols Y and Z are as hereinbefore defined. The compounds of Formula IV are dissolved in tetrahydrofuran and treated with lithium aluminum hydride in small portions with stirring in accordance with the procedure of Herr et al., JACS, vol. 75, 5927 (1953) thereby yielding the 20β-ols of Formula III above, which may be separated from the reduction mixture by conventional chromatography on alumina.

Compounds of the Formula III (e.g., Δ⁴-pregnene-20β-ol-3-one, 19-nor-Δ⁴-pregnene-20β-ol-3-one, 6α-methyl-Δ⁴-pregnene-20β-ol-3-one, 14α-methyl-Δ⁴-pregnene-20β-ol-3-one, 17α-methyl-Δ⁴-pregnene-20β-ol-3-one, or 21-methyl-Δ⁴-pregnene-20β-ol-3-one) are reacted with a formate ester in the presence of a basic condensation reagent. Although any ester of formic acid is utilizable, the preferred esters are those with lower alkanols or aralkanols, such as the lower alkyl formates (e.g., ethyl formate) and the monocyclic ar(lower alkyl) formates (e.g., benzyl formate). Among the suitable basic condensation reagents may be mentioned the alkali metals, the alkali metal hydrides (e.g., sodium hydride), the alkali metal alcoholates, and the alkali metal amides. The reaction is preferably conducted in the presence of an organic solvent for the steroid reactant, such as benzene, at any normal temperature, ambient temperature being preferred because of ease of handling.

The reaction results in the preparation of new intermediates of this invention, namely 2-hydroxymethylene derivatives of the starting steroids, which intermediates are of the general Formula V:

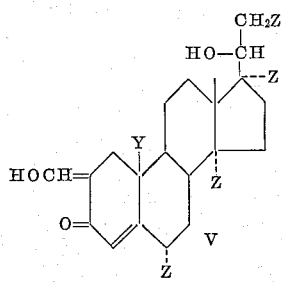

wherein Y and Z are as hereinbefore defined.

Compound V is then treated with ozone, preferably followed by hydrogen peroxide, to cleave and oxidize the A-ring, thereby yielding new intermediates of this invention of the Formula VI:

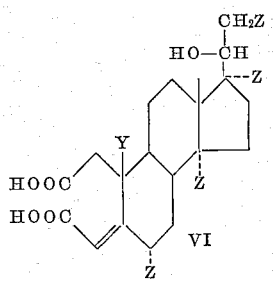

wherein Y and Z are as hereinbefore defined. The reaction is preferably conducted by dissolving the steroid reactant in an organic solvent such as ethyl acetate-acetic acid solution or chloroform.

Compound VI is then subjected to ring closure by heating to a temperature of at least about 200° C. (preferably about 225° C. to about 250° C.). The ring-closure is preferably conducted by dissolving the compound VI in an acid anhydride. When the reaction is so conducted, the product initially formed is an ester of Formula I (i.e., R' is acyloxy), the acid moiety of which corresponds to the anhydride employed. Although any acid anhydride wherein the compound VI is soluble may be used, the preferred anhydrides are those of hydrocarbon carboxylic acids of less than ten carbon atoms, as exemplified by the lower alkanoic acids (e.g., acetic and propionic anhydride), the monocyclic aromatic carboxylic acids, the monocyclic aralkanoic acids, the lower alkenoic acids, the cycloalkane carboxylic acids, and the cycloalkene carboxylic acids.

To prepare the free $20\beta$-hydroxyl compounds of this invention (compounds of Formula I wherein R' is $\beta$-hydroxy), the esters initially formed are hydrolyzed in the usual manner, as by treatment with a base such as sodium hydroxide. The free $20\beta$-hydroxyl compounds can then be oxidized, as by treatment with a hexavalent chromium compound (e.g. chromic acid), to convert the $20\beta$-hydroxy group to a 20-keto.

The compounds of Formula I, wherein R and R' are keto, are physiologically active steroids useful in both human and veterinary medicine. Thus, in addition to possessing pogestational activity, they are uniquely and highly useful agents in inhibiting or counteracting the effects of androgens (being therefore called anti-androgens) such as testosterone. For example, it has been found that administration of the anti-androgens of this invention to cases of hyperandrogenic acne (the acne condition resulting from the over abundance of an indrogen, such as testosterone) results in a marked abatement of skin eruption. The anti-androgens of this invention can be administered for this purpose either topically or systemically (e.g., subcutaneously) being formulated for such administration in conventional ointments or injectable liquid carriers.

The following examples are illustrative of the invention (all temperatures being in centigrade):

EXAMPLE 1

*2-hydroxymethylene-3-keto-$\Delta^4$-pregnene-20$\beta$-ol*

(A) 3-(N-PYRROLIDINYL)-3,5-PREGNADIENE-20-ONE

To a solution 10.0 grams of progesterone in 40 ml. of hot methanol is adfded 2.70 ml. of pyrrolidine. The product crystallizes almost immediately and after cooling, the mixture is filtered yielding about 11.7 grams of 3-(N-pyrrolidinyl)-3,5-pregnadiene-20-one. Recrystallization from ethyl acetate and then ether gives an analytical sample, M.P. about 188–190°.

*Analysis.*—Calcd. for $C_{25}H_{37}ON$: C, 81.69; H, 10.15; N, 3.81. Found: C, 81.52; H, 9.94; N, 4.04.

(B) $\Delta^4$-PREGNENE-20$\beta$-OL-3-ONE 43.7 grams of the product of step *a* is dissolved in 400 ml. of tetrahydrofuran and treated with 25 grams of lithium aluminum hydride in small portions with stirring. The mixture is stirred for one hour after addition of the hydride, after which time 125 ml. of water is added cautiously to decompose the complex. The mixture is diluted with 1200 ml. of methanol and a buffer consisting of 260 ml. of water, 212 grams of sodium acetate and 200 ml. of glacial acetic acid. The solution is heated under reflux for 2.5 hours and then concentrated under vacuum to remove the methanol. The concentrate is made strongly acidic with 1 l. of 3 N HCl and thoroughly extracted with three 500 ml. portions of chloroform. The combined chloroform extracts are washed with 5% sodium bicarbonate solution, 750 ml. water, dried over sodium sulfate and concentrated to dryness in vacuo. The residue is crystallized from ethyl acetate-hexane to give about 31.1 grams of impure $\Delta^4$-pregnene-20$\beta$-ol-3-one, M.P. about 161–164°, probably contaminated with the 20$a$-ol isomer. This material is chromatographed on acid washed alumina, and the 20$\beta$-ol is eluted with 1% chloroformbenzene. Recrystallization of the combined eluates gives pure $\Delta^4$-pregnene-20$\beta$-ol-3-one, M.P. about 173–174°, $[\alpha]+80°$ (ethanol); reported [Wieland, Helv. Chim. Acta. 32, 1923 (1949)] M.P. 171–172°, $[\alpha]+84°$ (chloroform).

(C) 2-HYDROXYMETHYLENE-3-KETO-$\Delta^4$-PREGNENE-20$\beta$-OL

Sodium hydride (13.4 g.) is added to a solution of 3-keto-$\Delta^4$-pregnene-20$\beta$-ol (27.7 g.) in 550 ml., of benzene and 28 ml. of ethyl formate and the reaction mixture allowed to stand under nitrogen for two days. Methanol (30 ml.) is added to decompose the excess sodium hydride and the solution is then diluted with 850 ml. of water. The layers are separated and the basic aqueous solution extracted with ether to remove neutral material. The aqueous layer is then acidified with 280 ml. of 3 N hydrochloric acid and the liberated enol extracted with ether. The ether extracts are washed with water, saturated sodium chloride solution, dried over sodium sulfate and concentrated. The residue of 2-hydroxy-methylene-3-keto-$\Delta^4$-pregnene-20$\beta$-ol is obtained as a light yellow, amorphous solid weighing about 29.9 g. The ultraviolet spectrum shows $\lambda_{max}^{alc.}$ 251 m$\mu$ (log $\epsilon$ 3.99) and 307 m$\mu$ (log $\epsilon$ 3.65)

EXAMPLE 2

*2,3-seco-$\Delta^4$-pregnene-20$\beta$-ol-2,3-dioic acid*

2-hydroxymethylene-3-keto-$\Delta^4$-pregnene-20$\beta$-ol (3.0 g.) is dissolved in 30 ml. of ethyl acetate and 30 ml. of acetic acid and ozonized at −10° C. with one molar equivalent of ozone. The resulting solution is diluted with 30 ml. of water and 7.5 ml. of 30% hydrogen peroxide and allowed to stand 48 hours. The resulting solution is concentrated to small volume under vacuum and diluted with 400 ml. of ether. The ether solution is extracted with three 30-ml. portions of 1 N sodium hydroxide, the basic extracts acidified with 20 ml. of 6 N hydrochloric acid and the product again extracted with ether. The combined ether extracts are washed with water, saturated sodium chloride solution, dried over sodium sulfate and concentrated to dryness under vacuum leaving about 2.51 g. of a colorless amorphous residue of 2,3-seco-$\Delta^4$-pregnene-20β-ol-2,3-dioic acid.

EXAMPLE 3

*A-nor-$\Delta^3$-pregnene-20β-ol-2-one acetate*

3.9 g. of 2,3-seco-$\Delta^4$-pregnene-20β-ol-2,3-dioic acid is dissolved in 15 ml. of acetic anhydride and the solution heated under reflux for one hour. The excess acetic anhydride is then allowed to distill off as the temperature is raised to 250°. When the evolution of carbon dioxide is complete the resulting acetate of A-nor-$\Delta^3$-pregnene-20β-ol-2-one is distilled at 0.01 mm. at 250°.

Following the procedure of Example 3 but substituting another acid anhydride for the acetic anhydride, the corresponding ester derivative is formed. Thus propionic anhydride yields A-nor-$\Delta^3$-pregnene-20β-ol-2-one propionate.

EXAMPLE 4

*A-nor-$\Delta^3$-pregnene-20β-ol-2-one*

2.47 g. of A-nor-$\Delta^3$-pregnene-20β-ol-2-one acetate is hydrolyzed with 80 ml. of 4% aqueous-alcoholic sodium hydroxide held at the boiling point for 45 minutes. Water (75 ml.) is added and the alcohol removed under vacuum. The resulting solution is extracted with ether to give A-nor-$\Delta^3$-pregnene-20β-ol-2-one which crystallizes from ethyl acetate-hexane, M.P. about 213–214°; [α]$_D$ −22° (ethanol).

EXAMPLE 5

*A-norprogesterone*

A-nor-$\Delta^3$-pregnene-2-one-20β-ol (500 mgs.) is dissolved in 50 ml. of acetone and treated dropwise with stirring with an equivalent amount of chromic acid-sulfuric acid in acetone solution. The precipitate of chromic salts is centrifuged off and the supernatant solution concentrated to dryness. The residue is dissolved in chloroform, washed with 5% sodium bicarbonate solution, water, saturated sodium chloride solution, dried over sodium sulfate and concentrated to dryness. The A-norprogesterone so obtained crystallizes from ethyl acetate-hexane in colorless prisms, M.P. about 150–151°; [α]$_D$ +76° (ethanol).

EXAMPLE 6

*A-nor-19-norprogesterone*

Following the procedures of Examples 1 through 5, but substituting 27 g. of 19-nor-3,20-diketo-$\Delta^4$-pregnene [Djerassi et al., JACS, vol. 75, 4440 (1953)] for the 3, 20-diketo-$\Delta^4$-pregnene in Example 1, there is obtained 19-nor-$\Delta^4$-pregnene-3-one-20β - ol - 2 - hydroxymethylene-3-keto-19-nor-$\Delta^4$-pregnene-20β-ol, 19-nor-2,3-seco-$\Delta^4$-pregnene-20β-ol-2,3-dioic acid, A-nor-19-nor-$\Delta^3$-pregnene-20β-ol-2-one acetate, A-nor-19-nor-$\Delta^3$-pregnene-20β-ol-2-one, and finally A-nor-19-norprogesterone.

Similarly, but substituting 6α-methyl-3,20-diketo-$\Delta^4$-pregnene [Burns et al., J. Chem. Soc. 4092 (1957)], 14α-methyl-3,20-diketo-$\Delta^4$-pregnene, 17α-methyl-3,20-diketo-$\Delta^4$-pregnene [Plattner et al., Helv. Chim. Acta. vol. 32, p. 270 (1949)], and 21 - methyl - 3,20 - diketo-$\Delta^4$-pregnene (Wettstein, Helv. Chim. Acta. vol. 23, 1371 (1940)) for the 3,20-diketo-$\Delta^4$-pregnene in the procedure of Example 1 and following the procedures of Examples 1 through 5, there is obtained A-nor-6α-methylprogesterone, A-nor-14α-methylprogesterone, A-nor-17α-methylprogesterone, and A-nor-21-methylprogesterone, respectively.

The invention may be variously otherwise embodied within the scope of the appended claims.

What is claimed is:

1. A compound of the formula wherein R is hydrogen, R' is selected from the group consisting of β-hydroxy and the β-acyloxy radical of a hydrocarbon carboxylic acid of less than ten carbon atoms, and together R and R' are keto, Y is selected from the group consisting of hydrogen and methyl, and Z is selected from the group consisting of hydrogen and methyl, no more than one Z being methyl.

2. A-norprogesterone.
3. A-nor-$\Delta^3$-pregnene-20β-ol-2-one.
4. A-nor-$\Delta^3$-pregnene-20β-ol-2-one acetate.
5. A compound of the formula wherein Y is selected from the group consisting of hydrogen and methyl, and Z is selected from the group consisting of hydrogen and methyl, no more than one Z being methyl.

6. 2,3-seco-$\Delta^4$-pregnene-20β-ol-2,3-dioic acid.

References Cited

UNITED STATES PATENTS

| | | | |
|---|---|---|---|
| 2,228,577 | 1/1941 | Marker | 260—586 |
| 2,844,513 | 7/1958 | Wettstein et al. | 260—397.4 |
| 2,865,935 | 12/1958 | Schneider et al. | 260—397.45 |
| 2,923,720 | 2/1960 | Lincoln et al. | 260—397.1 |

OTHER REFERENCES

Fieser and Fieser: "Steroids," Reinhold Pub. Corp., New York, 1959, p. 599.

Jacobs et al.: J. Am. Chem. Soc. 80, 4865–4868 (1958).

Rodd: "Chem. of Carbon Compounds," vol. IIB, pp. 771-2 (1953).

Romo: J.A.C.S., vol. 73, pp. 1528–33 (1951).

RICHARD K. JACKSON, *Primary Examiner.*

L. H. GASTON, M. LIEBMAN, *Examiners.*

B. G. COLLEY, P. O'DAY, G. E. LANDE, V. GARNER,
*Assistant Examiners.*